H. E. T. HAULTAIN.
APPARATUS FOR SEPARATING ORES BY FLOTATION.
APPLICATION FILED APR. 19, 1915.
1,218,400.
Patented Mar. 6, 1917
2 SHEETS—SHEET 1.
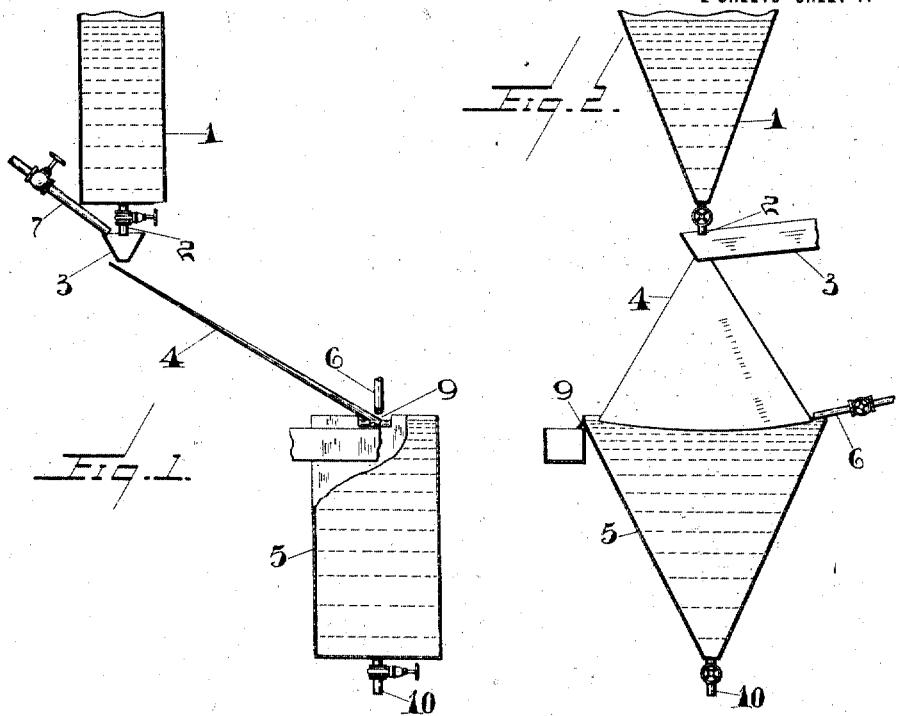
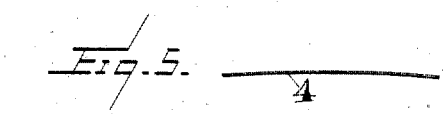
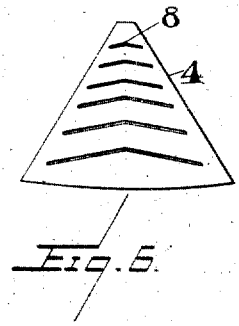
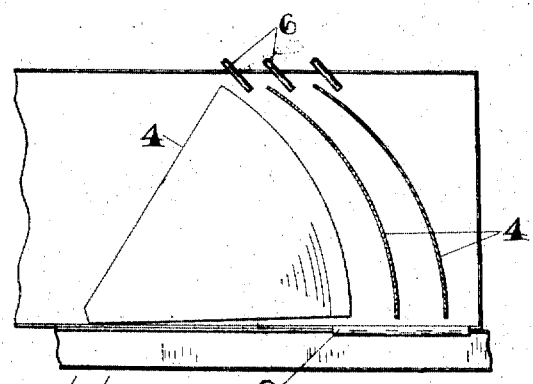
WITNESSES.
N. R. Tyndall
E. P. Hall
INVENTOR.
H. E. T. Haultain
BY J. Edward Maybee
ATTY.

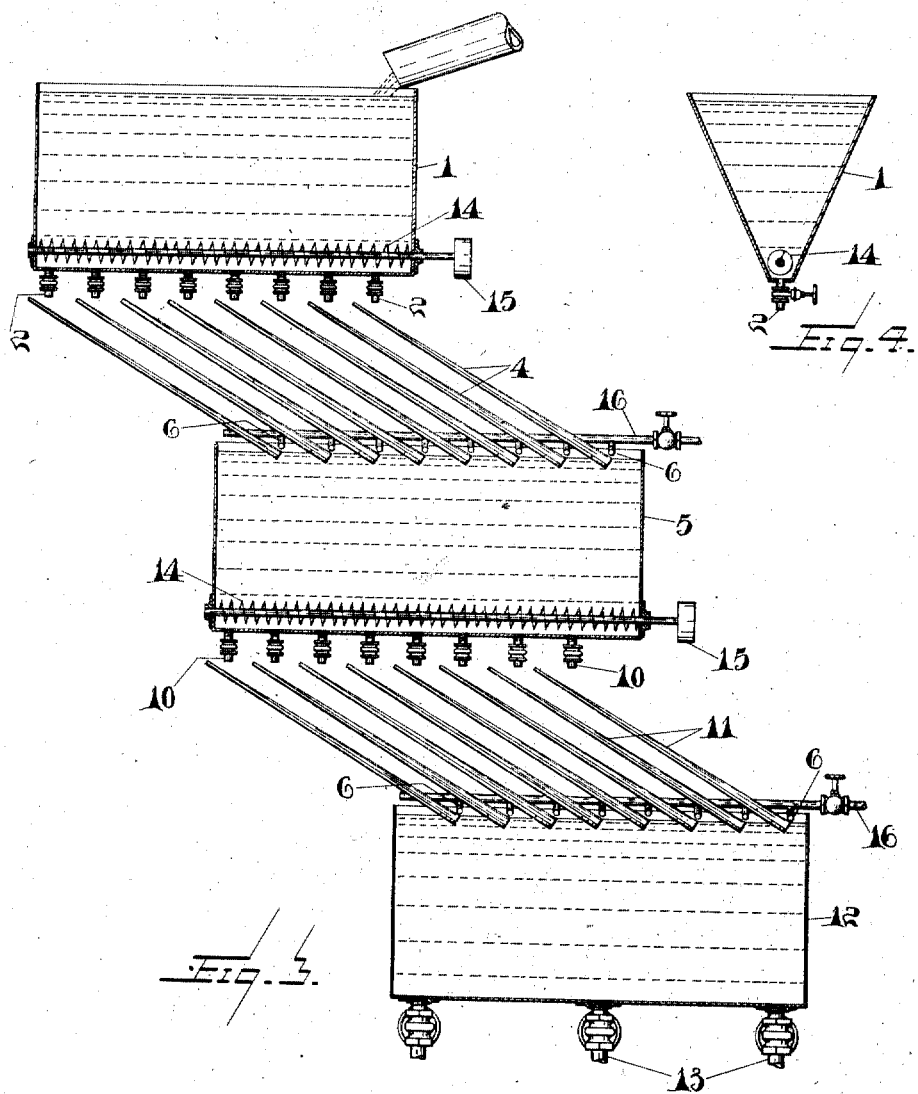

UNITED STATES PATENT OFFICE.

HERBERT E. T. HAULTAIN, OF TORONTO, ONTARIO, CANADA.

APPARATUS FOR SEPARATING ORES BY FLOTATION.

1,218,400. Specification of Letters Patent. Patented Mar. 6, 1917.

Application filed April 19, 1915. Serial No. 22,425.

*To all whom it may concern:*

Be it known that I, HERBERT E. T. HAULTAIN, of 174 College street, in the city of Toronto, county of York, Province of Ontario, Canada, a subject of the King of Great Britain, have invented certain new and useful Improvements in Apparatus for Separating Ores by Flotation, of which the following is a specification.

This invention relates to apparatus for treating pulped ores for the recovery of any valuable contents separable by flotation, and my object is to devise a form of apparatus which will be effective and which will possess great capacity in small compass.

I attain my object by using as the basis of my apparatus a plate shaped so that pulped ore discharged on to it at the upper end will spread out in a fan shape. The pulp is fed to the plate from a suitable receptacle, and the lower end of the plate dips below the water level of a second receptacle. The particles which float on the surface of the lower receptacle may be blown off to an overflow discharge by an air current.

In the preferred arrangement, to obtain capacity, a plurality of parallel plates are employed fed from a common feed receptacle and discharging to a common lower receptacle. To obtain efficiency the apparatus must be arranged so that the pulp passes in series over more than one surface. This is best effected by using the lower receptacle of the first series of plates as the feeding receptacle for a second series of plates which dip into a third receptacle. This in turn might be used to feed a third series of plates if desired. With the multiple arrangement of plates the air current is of particular importance, and a series of jets is provided to blow the floating particles at the surface of the lower receptacles in front of the plates to one side, whence they can pass to the overflow.

The apparatus is constructed in detail substantially as hereinafter specifically described and as illustrated in the accompanying drawings in which—

Figure 1 is a vertical longitudinal section of a simple form of apparatus constructed in accordance with my invention;

Fig. 2 a front elevation of the same partly in section;

Fig. 3 a vertical longitudinal section of a preferred form of my apparatus;

Fig. 4 a front elevation partly in section of part of the same;

Fig. 5 an end view of one of the plates;

Fig. 6 a front view of a modified form of plate, and

Fig. 7 a plan view partly in section.

In the drawings like numerals of reference indicate corresponding parts in the different figures.

Referring particularly to Fig. 1, 1 is a feed reservoir of any suitable construction, having a valve controlled outlet 2 at its lower end. This outlet discharges over the upper end of the inclined plate 4. Preferably, though not necessarily, the trough 3 is interposed between the outlet 2 and the plate, into which trough a water pipe 7 is led. Through this water pipe, water, either pure or previously agitated with a small quantity of oil, is introduced into the trough to mingle with the pulped ore from the outlet 2. The trough 3 discharges on the upper end of the inclined plate 4. This plate is inclined at a suitable angle to induce an even and sufficiently rapid flow of the pulp. Angles probably of from 30 to 45 degrees to the horizontal will be suitable.

The plate is triangular in form, as shown in Fig. 2, so that pulp may be spread out in fan shape thereon so that it thins out as its distance from the feeding point increases. To obtain proper effect, the plate must be so shaped as to produce this fan-shaped flow. A preferable form of the plate is one in which it is convexly curved in cross section as indicated in Fig. 5. The plate might either be part of the surface of a cylinder or a cone, preferably the former. A more or less useful effect might be obtained by providing the surface of the plate near its upper end with diverging ribs or depressions 8.

The lower end of the plate extends within the upper end of the lower receptacle 5 provided with the overflow 9. It will be noted that the lower end of the plate 4 extends below the water level in the receptacle 5.

This receptacle 5 is provided with the valve-controlled discharge opening 10. To obtain great capacity, it is necessary that a multiple arrangement be employed, the pulp being discharged to flow simultaneously over a number of plates. My plates are so shaped that this can readily be done. A preferred arrangement is shown in Fig. 3, in which a number of plates are arranged substantially parallel to one another, each being fed from the feed receptacle 1 by a separate outlet 2. To obtain efficiency the apparatus must be arranged so that the pulp passes in series over more than one surface. This is provided for by arranging a second series of plates 11 onto which the outlets 10 of the receptacle 5 discharge. The lower ends of the plates 11 extend below the water level in a third tank 12 provided with the overflow 13. A suitable outlet or outlets for tailings and surplus water is provided for this tank.

To insure that the same quality of pulp will be supplied to all the outlets 2 and 10, I provide each of the tanks 1 and 5 with a screw conveyer 14 carried by a shaft suitably journaled in the bottom of the tank, provided with a driving pulley 15. While the apparatus is in operation, these conveying screws are kept running at such speed as may be found necessary. It is important that floating particles be kept in motion and directed as promptly as possible to the overflows. I therefore provide for each plate an air nozzle 6 directed and so located as to direct a current of air along the surface of the water in front of, and as a rule substantially parallel to the lower end of the plate. A single nozzle only, of course, is necessary in the simple construction shown in Figs. 1 and 2, but in the constructions shown in Figs. 3 and 4 a nozzle is provided for each plate and they are connected to a common supply pipe 16. The pipe 16 may be connected to any suitable blower.

I find that if the plates are so arranged that the chords of the arcs of their cross sections are at right angles to the sides of the tank into which they dip, that floating particles have a tendency to stick after passing the center as the space between any two plates necessarily narrows toward each side. I overcome this difficulty by setting the plates as shown in Fig. 7 with said chords inclined to the sides of the tank but parallel to one another. The space between any two plates then necessarily widens from one side to the other and no sticking will occur if the floating particles are blown from the narrower to the wider end.

It will be understood, of course, that the apparatus is adapted for use in separating by flotation any floatable ores, particularly ores containing mixtures of sulfids. The ores may be treated in any of the well known ways to facilitate flotation, as, for example, by the addition of acids or alkali or other chemical reagents and to pulps agitated with oils or other reagents adapted to facilitate flotation.

What I claim as my invention is:

1. In ore flotation apparatus, the combination of a feed receptacle for pulp; a plurality of substantially parallel relatively closely set and overlapping inclined plates on to each of which said receptacle discharges, and a second liquid containing receptacle to which the inclined plates discharge, said receptacle having an overflow discharge.

2. In ore flotation apparatus, the combination of a feed receptacle for pulp; a plurality of substantially parallel relatively closely set and overlapping inclined plates on to each of which said receptacle discharges, said plates being shaped to spread the pulp out in fan shape thereon; and a second liquid containing receptacle to which the inclined plates discharge, said receptacle having an overflow discharge.

3. In ore flotation apparatus, the combination of a feed receptacle for pulp; a plurality of substantially parallel relatively closely set and overlapping inclined plates on to each of which said receptacle discharges, said plates being convexly curved in cross section to spread the pulp out in fan shape thereon; and a second liquid containing receptacle to which the inclined plates discharge, said receptacle having an overflow discharge.

4. In ore flotation apparatus, the combination of a feed receptacle for pulp; a plurality of substantially parallel relatively closely set and overlapping inclined substantially triangular plates on to each of which said receptacle discharges, said plates being shaped to spread the pulp out in fan shape thereon; and a second liquid containing receptacle to which the inclined plates discharge, said receptacle having an overflow discharge.

5. In ore flotation apparatus, the combination of a feed receptacle for pulp; a plurality of substantially parallel relatively closely set and overlapping inclined plates on to each of which said receptacle discharges, said plates being shaped to spread the pulp out in fan shape thereon; a second receptacle to which the inclined plates discharge; and a plurality of air nozzles adapted to discharge currents of air along the surface of the water in the second receptacle in front of the inclined plates.

6. In ore flotation apparatus, the combination of a feed receptacle for pulp; a plurality of substantially parallel relatively closely set and overlapping inclined plates on to each of which said receptacle discharges, said plates being convexly curved in cross section to spread the pulp out in fan shape thereon; a second receptacle to which the inclined plates discharge; and a plurality of air nozzles adapted to discharge currents of air along the surface of the water in the second receptacle in front of the inclined plates.

7. In ore flotation apparatus, the combination of a feed receptacle for pulp; a plurality of substantially parallel relatively closely set and overlapping inclined substantially triangular plates on to each of which said receptacle discharges, said plates being shaped to spread the pulp out in fan shape thereon; a second receptacle to which the inclined plates discharge; and a plurality of air nozzles adapted to discharge currents of air along the surface of the water in the second receptacle in front of the inclined plates.

8. In ore flotation apparatus the combination of a tank having an overflow discharge and a plurality of substantially parallel relatively closely set and overlapping inclined plates dipping into said tank, said plates being curved in cross section and set with their convex sides uppermost, the plates also being set with the chords of their cross sectional curves inclined to the sides of the tank to cause the spaces between the plates to increase in width from one side toward the other.

9. In ore flotation apparatus, the combination of a tank and a plurality of substantially parallel relatively closely set and overlapping inclined plates dipping into said tank, said plates being curved in cross section and set with their convex sides uppermost, the plates also being set with the chords of their cross sectional curves inclined to the sides of the tank to cause the spaces between the plates to increase in width from one side toward the other, and means for blowing air between said plates in the direction of said increase of width.

10. In ore flotation apparatus, the combination of a feed receptacle for pulp; a plurality of substantially parallel relatively closely set and overlapping inclined plates on to each of which said receptacle discharges, a second receptacle to which the inclined plates discharge; and a plurality of air nozzles adapted to discharge currents of air along the surface of the water in the second receptacle in front of the inclined plates.

Signed at Toronto, Canada, this 10th day of April, 1915, in the presence of the two undersigned witnesses.

HERBERT E. T. HAULTAIN.

Witnesses:
GEO. P. MACKIE,
N. R. TYNDALL.